United States Patent
Li et al.

(10) Patent No.: US 9,078,253 B2
(45) Date of Patent: Jul. 7, 2015

(54) APPARATUS AND METHOD FOR MACHINE-TYPE COMMUNICATIONS

(71) Applicant: Samsung Electronics Co., Ltd., Gyeonggi-do (KR)

(72) Inventors: Ying Li, Richardson, TX (US); Jianzhong Zhang, Plano, TX (US); Jin-Kyu Han, Allen, TX (US); Young-Han Nam, Richardson, TX (US); Boon Loong Ng, Richardson, TX (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 113 days.

(21) Appl. No.: 13/686,621

(22) Filed: Nov. 27, 2012

(65) Prior Publication Data

US 2013/0136098 A1 May 30, 2013

Related U.S. Application Data

(60) Provisional application No. 61/564,182, filed on Nov. 28, 2011.

(51) Int. Cl.
*H04W 72/04* (2009.01)
*H04W 48/12* (2009.01)

(52) U.S. Cl.
CPC ........ *H04W 72/042* (2013.01); *H04W 72/0453* (2013.01); *H04W 48/12* (2013.01)

(58) Field of Classification Search
CPC ..... H04W 72/04; H04W 88/08; H04W 76/00; H04W 80/04; H04W 84/12; H04W 88/06; H04W 48/12; H04L 5/0091; H04L 5/0094
USPC .......... 370/229, 230, 235, 329, 330, 341, 348
See application file for complete search history.

(56) References Cited

U.S. PATENT DOCUMENTS

2012/0327895 A1* 12/2012 Wallen et al. ................. 370/330

OTHER PUBLICATIONS

International Search Report dated Mar. 26, 2013 in connection with International Patent Application No. PCT/KR2012/010183, 3 pages.
3GPP TSG RAN WG1 #67; "Standards aspects impacting low-cost MTC UEs" R1-114245; Samsung; San Francisco, U.S.; Nov. 14-18, 2011; 4 pages.
3GPP TSG RAN WG1 #67; "Review of approaches for bandwidth reduction for low complexity MTC LTE UEs"; IPWireless Inc.; San Francisco, U.S.; Nov. 14-18, 2011; 5 pages.
3GPP TSG RAN WG1 #67; "Considerations for low-cost MTC UEs based on LTE"; ETRI; San Francisco, U.S.; Nov. 14-18, 2011; 3 pages.
3GPP TSG RAN WG1#67; "Considerations on the bandwidth reduction for low cost MTC UE"; Huawei, HiSilicon; San Francisco, U.S.; Nov. 14-18, 2011; 6 pages.

* cited by examiner

*Primary Examiner* — Dady Chery

(57) ABSTRACT

A network and user equipment are configured to support machine type communications is provided. The UE includes processing circuitry to process a physical broadcast channel (PBCH) to acquire at least one system information block (SIB). The processing circuitry also processes the at least one SIB to determine a location of a lite SIB (SIB-L). The processing circuitry determines a location of a lite physical downlink control channel (L-PBCCH) from the SIB-L.

21 Claims, 13 Drawing Sheets

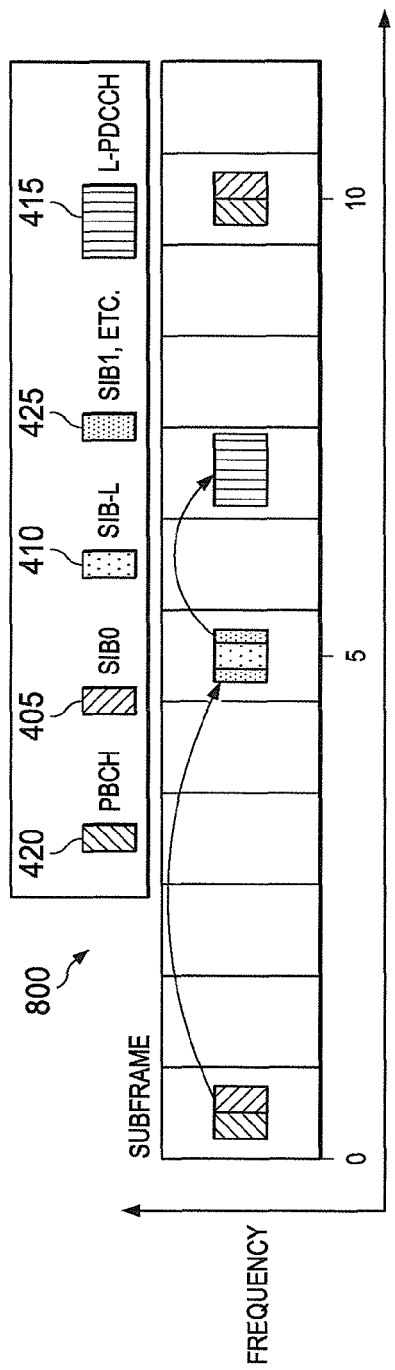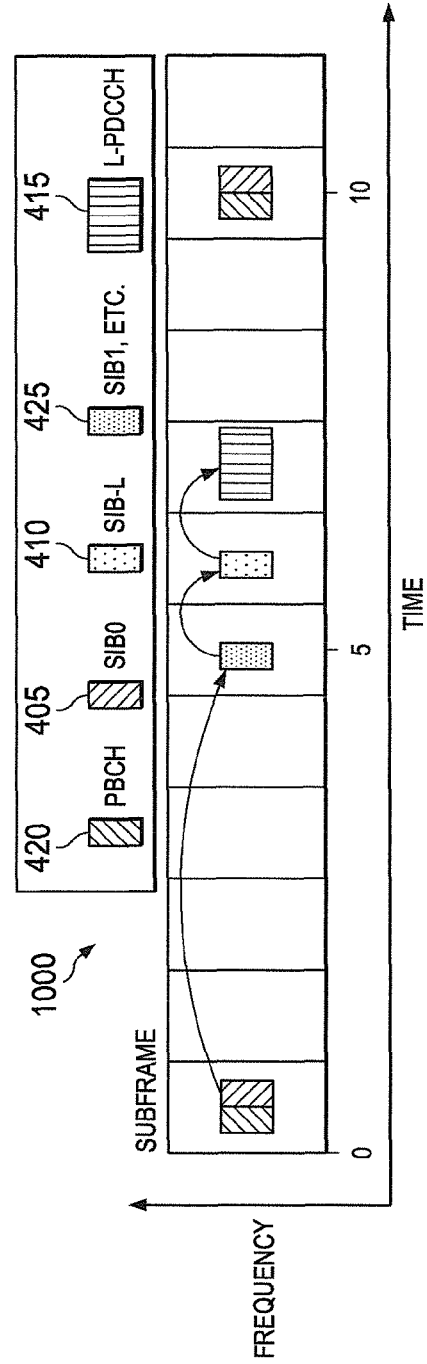

APPARATUS AND METHOD FOR MACHINE-TYPE COMMUNICATIONS

CROSS-REFERENCE TO RELATED APPLICATION(S) AND CLAIM OF PRIORITY

The present application claims priority to U.S. Provisional Patent Application Ser. No. 61/564,182, file Nov. 28, 2011, entitled "METHODS AND APPARATUS TO SUPPORT MACHINE-TYPE COMMUNICATIONS". The content of the above-identified patent documents is incorporated herein by reference.

TECHNICAL FIELD

The present application relates generally to wireless communications and, more specifically, to a method and apparatus for supporting machine-type communications.

BACKGROUND

Machine Type Communications (MTC), or Machine-to-Machine (M2M) communications, is expanding rapidly. MTC (or M2M) is a form of communication that involves one or more entities that do not necessarily require human interaction. MTC devices include meters, sensors, healthcare devices, cars, smart phones, road security, and other consumer electronic devices. Since machines are excellent at routine and well-defined tasks that require a constant level of attention and machines can react to inputs very quickly, MTC devices allow people to avoid dull and repetitious work.

SUMMARY

A user equipment (UE) configured for machine type communications (MTC) is provided. The UE includes a receiver configured to receive a physical broadcast channel (PBCH) in a reduced bandwidth from at least one base station. The reduced bandwidth comprising a subset of a bandwidth for a standard UE. The UE includes processing circuitry configured to process the PBCH to acquire system information blocks (SIB). At least one SIB is configured to indicate a location of a lite SIB (SIB-L). The SIB-L configured to indicate a location of a lite physical downlink control channel (L-PDCCH).

A wireless communications network configured to communicate with at least one user equipment (UE) configured for machine type communications (MTC) is provided. The network includes a base station configured to transmit a physical broadcast channel (PBCH) in a reduced bandwidth to the at least one UE. The reduced bandwidth comprising a subset of a bandwidth for a standard UE. The PBCH is configured to enable the at least one UE to acquire system information blocks (SIB). At least one SIB is configured to indicate a location of a lite SIB (SIB-L). The SIB-L configured to indicate a location of a lite physical downlink control channel (L-PDCCH).

A method for supporting machine type communications is provided. The method includes processing a physical broadcast channel (PBCH) to acquire at least one system information block (SIB). The method also includes processing the at least one SIB to determine a location of a lite SIB (SIB-L). The method further includes determining a location of a lite physical downlink control channel (L-PBCCH) from the SIB-L.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates another resource allocation according to embodiments of the present disclosure;

FIG. 10 illustrates another resource allocation according to embodiments of the present disclosure;

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the LTE terms "node B," "enhanced node B," and "eNodeB" are other terms for "base station" used below. A base station as described herein may have a globally unique identifier, known as a base station identifier (BSID). For some embodiments, the BSID may be a MAC ID. Also, a base station can have multiple cells (e.g., one sector can be one cell), each with a physical cell identifier, or a preamble sequence, which may be carried in a synchronization channel. In addition, the LTE term "user equipment" or "UE" is another term for "subscriber station" used below, and a "mobile station" as described herein is interchangeable with a "subscriber station."

Figure 1:
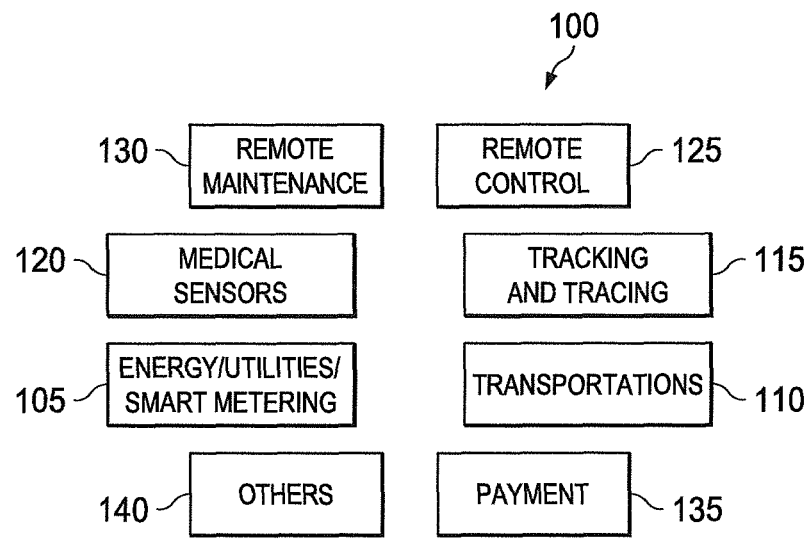
FIG. 1 illustrates some use cases of machine-type communications according to the disclosure.

In the following, a lite User Equipment (UE) refers to a UC that can be implemented with low cost. An MTC UE can be a lite UE. A legacy UE, or a regular UE, or non-lite UE, refers to a UE that is a regular UE and that can use the system designed for a regular UE, not the special system designed for lite UE. The terms are mainly applicable in 3GPP/LTE/LTE-A, however, the technologies are not limited to these systems, rather, they can be applied to other systems where the terms may be called as other names FIG. 1 illustrates a machine-type communications according to the disclosure. The embodiment of the machine-type communications (MTC) shown in FIG. 1 is for illustration only. Other embodiments could be used without departing from the scope of this disclosure.

Use cases of MTC 100 include metering 105, road security and wireless connectivity in automobiles 110, tracing and tracking 115, healthcare devices 120, sensors, remote controls 125, remote maintenance 130, payment systems 135 and others 140 including consumer electronic devices, such as smart phones, e-book readers, digital picture frames, connected sports devices, and the like. MTC also is important for many emerging use cases.

The communication functionalities defined for a legacy Long Term Evolution (LTE) User Equipment (UE) can be supported by MTC UEs as well. However, in order to tailor the cost of terminals for the low-end of the MTC market to be competitive with that of Global System for Mobile Communications (GSM)/General Packet Radio Service (GPRS) terminals, it can be considered that low cost LTE MTC UEs support a limited set of functionalities compared to normal LTE UEs, toward reducing the implantation cost and complexity with meeting the performance requirements for low cost MTC UEs at the same time. The feature down-selection may be applicable to low cost voice-support LTE UEs in future if necessary.

In 3GPP RAN #53 meeting, the study item for low-cost MTC (machine-type communications) UEs based on LTE was approved (See RP-111112, "SID: Provision of low-cost MTC UEs based on LTE", 3GPP TSG RAN#53, Vodafone, Fukuoka, Japan, 13-16 Sep. 2011, the contents of which are hereby incorporated by reference in their entirety). Embodiments, of the present disclosure provide methods, systems and an apparatus to support a low cost MTC UEs (also referred to as a LTE-Lite UE).

Certain embodiments of the present disclosure provide methods for reducing RF component cost in the devices, including (for example) simplifications and reductions in support of bands/RATS/RF chains/antenna ports, transmission power, maximum channel bandwidth less than the maximum specified for respective frequency band, and support of half-duplex FDD mode.

Certain embodiments of the present disclosure provide methods for reducing the processing in the device, additionally considering baseband-RF conversion aspects, significantly lower peak data rate support, no support of spatial processing mode in uplink/downlink, and reduced radio protocol processing.

Certain embodiments of the present disclosure provide features to allow cost reduction, but which also bring a reduction in LTE system performance. Certain embodiments are restricted to devices that only operate as MTC devices not requiring high data rates and/or low latency, after further careful study.

Figure 2:
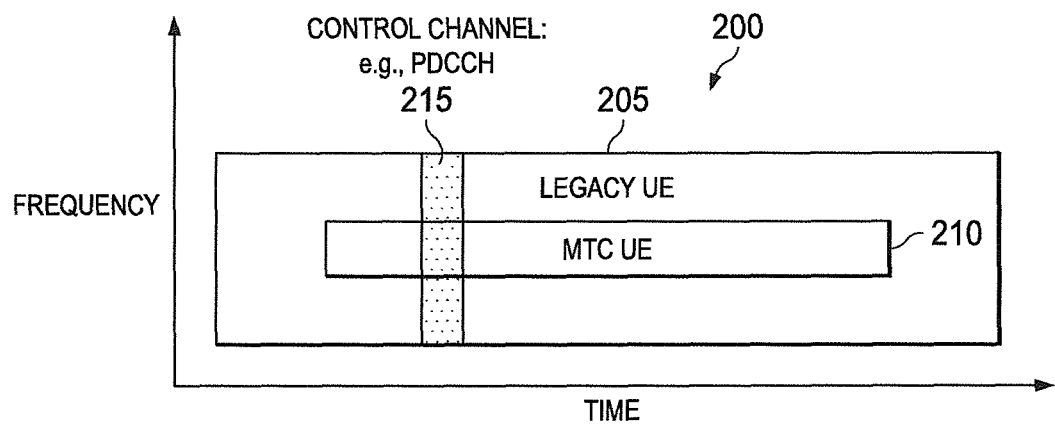
FIG. 2 illustrates bandwidth reduction according to embodiments of the present disclosure.

FIG. 2 illustrates bandwidth reduction according to embodiments of the present disclosure. The embodiment of the bandwidth reduction 200 shown in FIG. 2 is for illustration only. Other embodiments could be used without departing from the scope of this disclosure.

In certain embodiments, bandwidth reduction 200 is supported for low cost MTC UE. The MTC UE and regular UE can coexist in the same band. The legacy UE can use time and frequency resources in a first location 205. Note that legacy UE and regular UE can be interchangeable and they are used to stand for the UE which uses the legacy or regular protocol which can be for non-MTC UE. The MTC UE can use time and frequency resources in a second location 210. Note that the resources in the second location 210 may be shared by the MTE UE and legacy UE.

In certain embodiments, in order to meet the low cost target with low data rate support, MTC UEs support small channel bandwidth such as illustrated as the reduced bandwidth in the second location 210, such as 1.4 MHz. This can correspondingly reduce complexity and cost of RF/IF filters, FFT/IFFT components, ADC/DAC, other digital processing circuitry, and the like.

However, when the MTC UEs with narrow bandwidth transmission/reception capability access a cell with wider system bandwidth, some issues arise. For example, the MTC UEs cannot understand PDCCH (physical downlink control channel) 215 whose transmission is spread over the whole downlink transmission bandwidth, resulting that PDSCH (physical downlink shared channel, including the one conveying SIB) scheduled via the PDCCHs cannot be decoded by the MTC UEs. The same problem exists for PCFICH (Physical Control Format Indicator Channel) and PHICH (Physical Hybrid-ARQ (Automatic Repeat reQuest) Indicator Channel) as well. Embodiments of the present disclosure address these issues.

Figure 3:
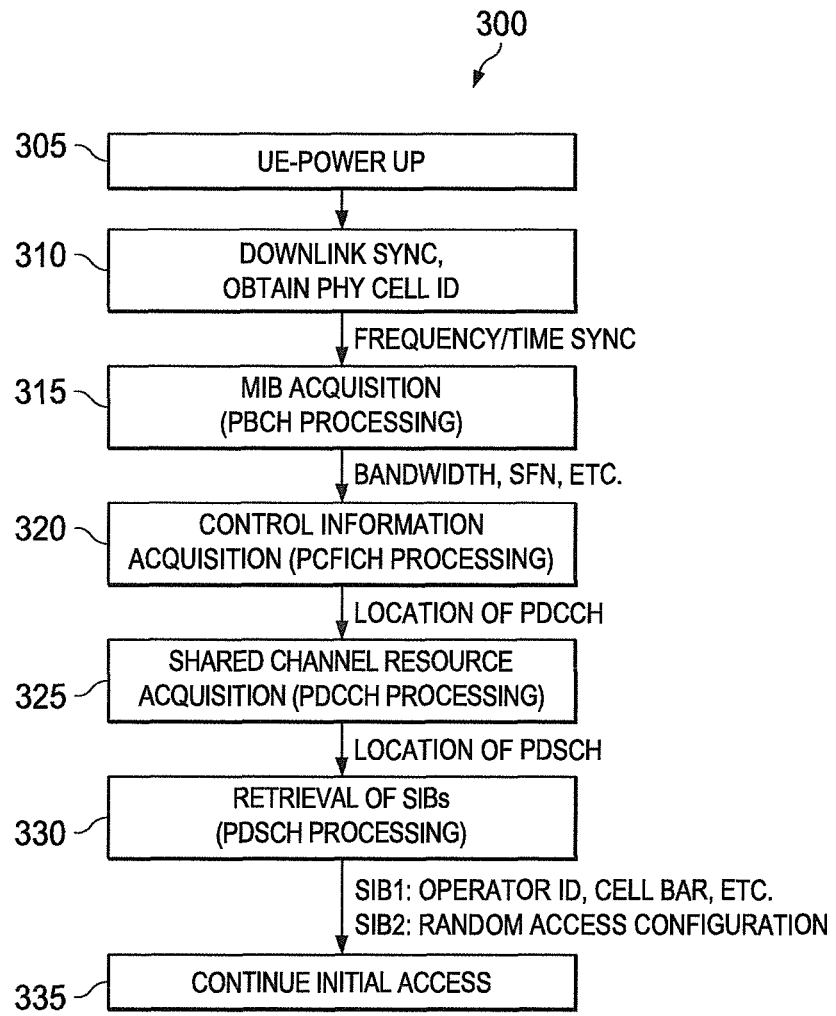
FIG. 3 illustrates a process wherein a legacy UE obtains system information blocks (SIBs) according to the present disclosure.

FIG. 3 illustrates a process wherein a legacy UE obtains system information blocks (SIBs) according to the present disclosure. For Physical Broadcast Channel (PBCH) detection: To detect PBCH, the UE needs to know cell specific reference signal (CRS). To know the location of CRS, the UE needs to blind decode the number of antenna ports (1, 2, 4 ports), hypothesis testing on PBCH decoding. Once the ports number is known, UE knows how many CRSs it is expecting to read. For measurement (Reference Signal Received Power (RSRP), Reference Signal Received Quality (RSRQ)) purpose, port zero is used mostly, and port 1 is also used in some cases.

In block 305, the UE powers up. The UE obtains the physical (PHY) cell ID in block 310. The UE performs a downlink sync such as a frequency/time sync. The PHY cell ID is the preamble in the synchronization channel. In block 315, the UE performs Master Information Block (MIB) acquisition by PBCH processing (e.g., bandwidth, Superframe Number (SFN), and so forth). Control information acquisition, using the Physical Control Channel Format Indication Channel (PCFICH) occurs in block 320 to determine the location of the Physical Downlink Control Channel, (PDCCH). The PDCCH is processed in block 325 for shared channel resource acquisition to determine the location of the Physical Downlink Shared Channel (PDSCH) (typically for data channel and some control channel). In block 330, the UE performs PDSCH processing to retrieve the System Information Block (SIB), which is the broadcast information that each UE may need to know. Thereafter, the UE continues initial access in block 335.

The PDCCH for lite UEs can be different from the PDCCH for regular UEs (L-PDCCH). The notation of "lite UE" is used to denote the UE that is a low cost MTC UE. In certain embodiments, the lite UE is interchangeable for MTC UE. The PDCCH for lite UEs is denoted as L-PDCCH (lite PDCCH). Note that L-PDCCH can also be of another name, such as E-PDCCH (enhanced PDCCH). L-PDCCH can also be a version of E-PDCCH with some additional changes for the consideration of support for lite UE. The system information for a lite UE can be in the System Information Block for lite UE (SIB-L). The SIB-L can include some system information unique to lite UE (e.g., information not needed for regular UE), such as the configuration information of L-PDCCH, e.g., the time and frequency location of the L-PDCCH, information related to search space composition, and so forth.

Figure 4:
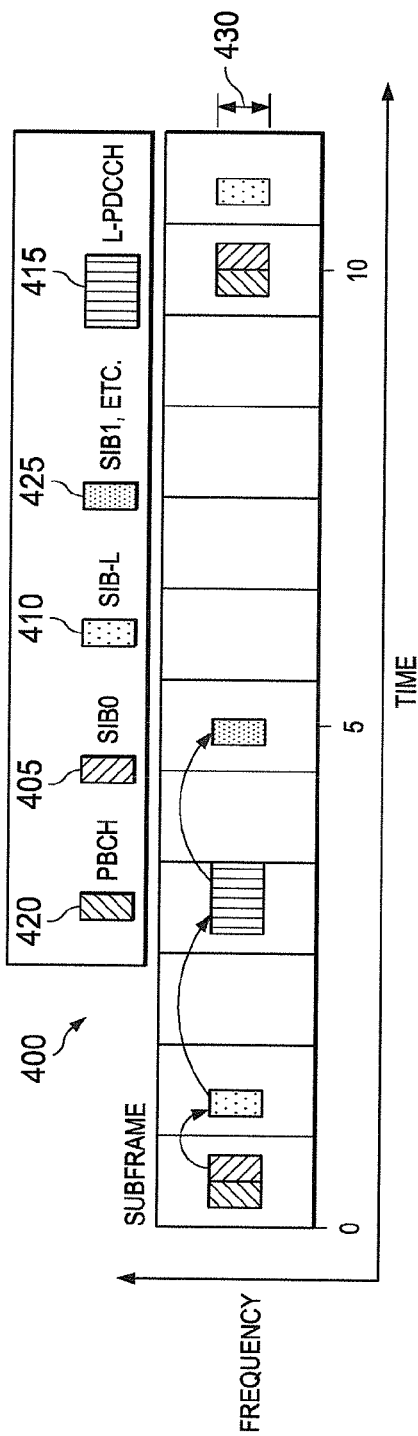
FIG. 4 illustrates a resource allocation according to embodiments of the present disclosure.

FIG. 4 illustrates a resource allocation according to embodiments of the present disclosure. The embodiment of the resource allocation 400 shown in FIG. 4 is for illustration only. Other embodiments could be used without departing from the scope of this disclosure.

System Information Block 0 (SIB0) 405 delivers information related to SIB-L 410 to help the lite UE to obtain SIB-L 410. A physical downlink channel can be used to deliver SIB0 405. SIB-L 410 indicates a location and configuration of L-PDCCH 415. The L-PDCCH 415 on the PDSCH provides SIB configurations, common signaling, UE specific resource allocation, and so forth. That is, the physical downlink channel SIB0 405 can be obtained by the UE after the UE obtains the PBCH 420. After UE acquires SIB-L 410, the UE knows the location of L-PDCCH 415. L-PDCCH 415 can be on the PDSCH. The SIB-L 410 includes information to indicate the PDSCH locations where the L-PDCCH 415 is located.

The L-PDCCH 415 includes information to indicate the PDSCH for other SIBs and PDSCH for an individual UE or group of UEs. Then, the UE can access to other SIBs. The UE determines the UE specific resources in PDSCH, as indicated by L-PDCCH 415. In certain embodiments, the L-PDCCH 415 is the Enhanced Physical Downlink Control Channel (E-PDCCH).

The PBCH 420, SIB0 405, SIB-L 410, SIB1 425, L-PDCCH 415 are in a central frequency band 430 that is accessible by a lite UE. The time domain allocations for these are just illustrations, and they can be in other times than illustrated by the example shown in FIG. 4. For example, L-PDCCH 415 can be in subframe #1/2/4, rather than sub-frame #3. L-PDCCH 415 also can be in multiple sub-frames if needed.

Figure 5:
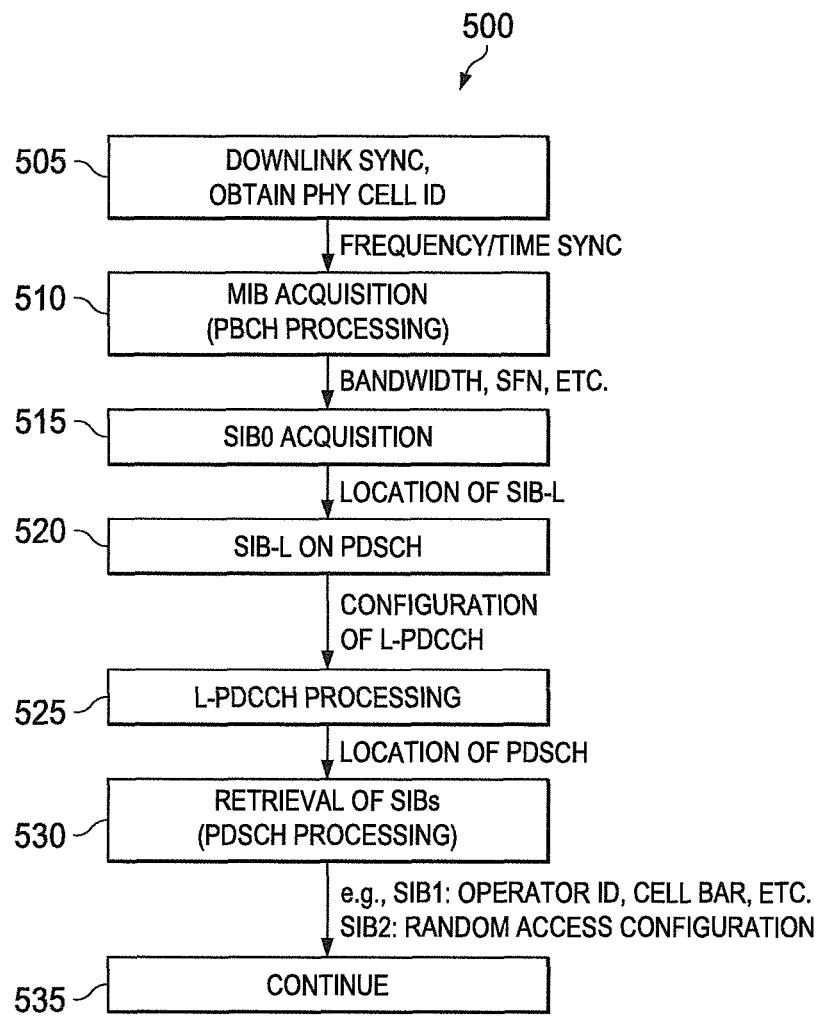
FIG. 5 illustrates a process for a lite UE acquiring system information according to embodiments of the present disclosure.

FIG. 5 illustrates a process for a lite UE acquiring system information according to embodiments of the present disclosure. The lite UE can be an MTC, such as a low cost MTC. In block 505, the UE obtains the physical (PHY) cell ID. The lite UE can first obtain the synchronization channel and the physical cell ID, and then it can have the frequency/time domain sync. Then the UE processes the PBCH and acquires the MIB information in block 510. The UE can obtain the bandwidth and superframe number (SFN). Then the UE obtains SIB0, and SIB-L, and the UE knows the L-PDCCH locations. That is, SIB0 acquisition occurs in block 515 to determine the location of the SIB-L. The SIB-L is processed in block 520 for the configuration of L-PDCCH. In block 525, the UE processes the L-PDCCH in the shared channel to determine the location of the other SIBs locations in PDSCH. PDSCH processing occurs in block 530 to retrieve the SIBs, which is the broadcast information that each UE may need to know. The UE can further decode other SIBs. The UE can also know the UE specific resources in PDSCH, where the resource allocation is indicated in L-PDCCH. That is, the PDSCH processing can include SIB1: operator ID, cell bar, and so forth; and SIB2: random access configuration. Group specific resource allocation in PDSCH can be also indicated in L-PDCCH, and a UE can decode it if it is in the said group. Thereafter, the UE continues access in block 535. The entire process can be used for the initial access, or the process can be used for whenever the UE needs to re-enter the system. Once the UE is connected, the UE can carry out steps 510 (may be omitted if MIB is not updated), 515, 520, 525, 530 if needed such as when the UE needs to get the updated system information. When the UE is connected, the UE can carry out steps 515, 520, 525, and if the UE decodes there is data scheduled for it in step 525, the UE can decode PDSCH for its data.

Figure 6:
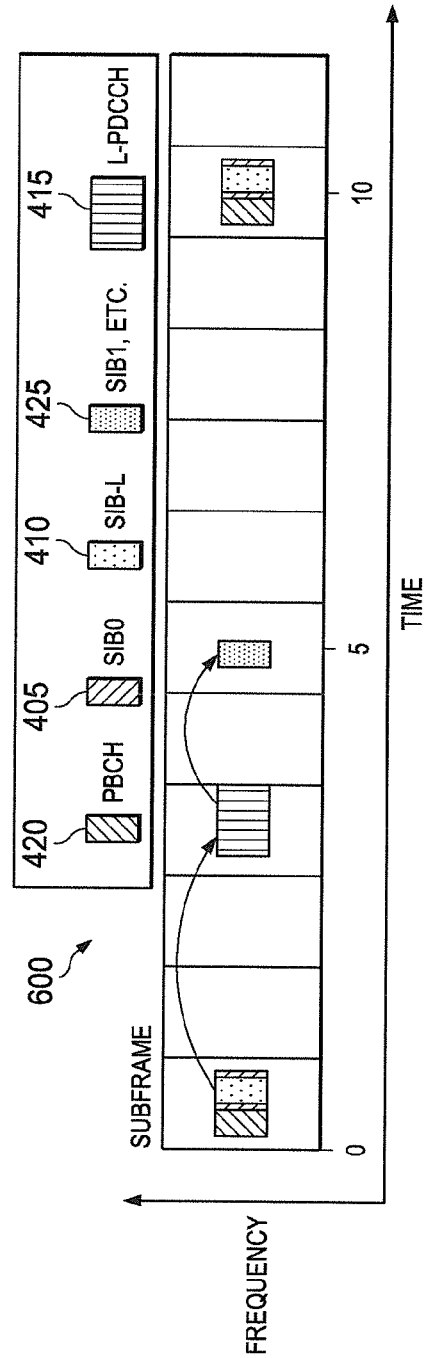
FIG. 6 illustrates another resource allocation according to embodiments of the present disclosure.

FIG. 6 illustrates another resource allocation according to embodiments of the present disclosure. The embodiment of the resource allocation 600 shown in FIG. 6 is for illustration only. Other embodiments could be used without departing from the scope of this disclosure.

In certain embodiments, SIB0 405 includes SIB-L 410. SIB0 405 can be located next to the PBCH 420. SIB-L 410 can be the only content that SIB0 405 carries. That is, in certain embodiments, SIB-L 410 becomes SIB0 405 or SIB0 405 also is SIB-L 410. SIB-L 410 can be delivered over a physical downlink channel; therefore, SIB0 405 can be omitted. The physical downlink channel for SIB-L 410 can be obtained by the UE after the UE obtains the PBCH 420. After the UE acquires SIB-L 410, the UE knows the location of L-PDCCH 415.

Figure 7:
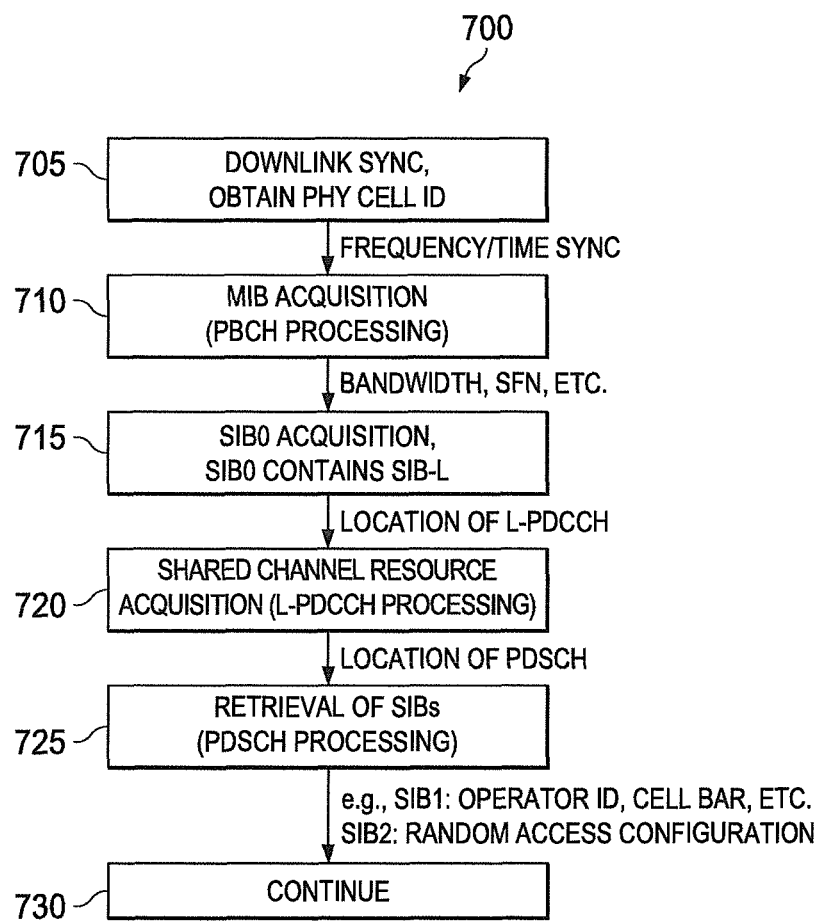
FIG. 7 illustrates another process for a lite UE acquiring system information according to embodiments of the present disclosure.

FIG. 7 illustrates another process for a lite UE acquiring system information according to embodiments of the present disclosure. The lite UE can be an MTC, such as a low cost MTC. In block 705, the UE obtains the physical (PHY) cell ID. The lite UE obtains the synchronization channel and the physical cell ID, and then the UE has the frequency/time domain sync. Then the UE processes the PBCH and acquires the MIB information in block 710. The UE obtains the bandwidth and superframe number. Then the UE obtains SIB0, which includes SIB-L, and the UE knows the L-PDCCH locations. That is, SIB0 acquisition occurs in block 715 and SIB0 contains SIB-L or is SIB-L. The L-PDCCH is processed in block 720 in the shared channel to determine the location of the other SIBs locations in PDSCH. PDSCH processing occurs in block 725 to retrieve the SIBs, which is the broadcast information that each UE may need to know. The UE can further decode other SIBs. The UE can also know the UE specific resources in PDSCH, where the resource allocation is indicated in L-PDCCH. Group specific resource allocation in PDSCH can be also indicated in L-PDCCH, and a UE can decode it if it is in the said group. Thereafter, the UE continues access in block 730. The entire process can be used for the initial access, or the process can be used for whenever the UE needs to re-enter the system. Once the UE is connected, the UE can carry out steps 710 (may be omitted if MIB is not updated), 715, 720, 725, if needed such as when the UE needs to get the updated system information. When the UE is connected, the UE can carry out steps 715, 720, and if the UE decodes there is data scheduled for it in step 720, the UE can decode PDSCH for its data.

FIG. 8 illustrates another resource allocation according to embodiments of the present disclosure. The embodiment of the resource allocation 800 shown in FIG. 8 is for illustration only. Other embodiments could be used without departing from the scope of this disclosure.

In certain embodiments, SIB1 425 includes SIB-L 410. For regular UE, SIB1 425 scheduling in time domain is already fixed. Regular PDCCH is used to indicate the presence of PDSCH containing SIB1 425, the RB assignment in the frequency domain, and its transmission format. For the lite UE on small bandwidth, since the regular PDCCH cannot be decoded, the lite UE uses SIB0 405 to get the information of SIB1 425. After the lite UE successfully decode the SIB0 405, the lite UE knows the information about SIB1 425, including where to find SIB1 425. The regular UE and the lite UE can get to SIB1 425 via different initial procedure.

In SIB1 425, there can be some fields common for both the regular UE and the lite UE, some fields only for regular UE, and some fields only for the lite UE. The regular UE will not try to decode the fields for the lite UE exclusively, and vice versa. The advantage is that the common fields for regular and lite UEs are efficiently sent, without duplicated copy to regular UE and lite UE respectively.

SIB0 405 can be located next to the PBCH 420 or indicated by PBCH 420. SIB0 405 indicates a location of SIB1 425. SIB-L 410 indicates the configuration of L-PDCCH 415. SIB-L 410 can be the only content that SIB1 425 carries. That is, in certain embodiments, SIB-L 410 becomes SIB1 425 or SIB1 425 also is SIB-L 410. SIB-L 410 can be delivered over a physical downlink channel; therefore, SIB1 425 can be omitted. The physical downlink channel for SIB-L 410 can be obtained by the UE after the UE obtains SIB0 405. After the UE acquires SIB-L 410, the UE knows the location of L-PDCCH 415. SIB1 425 scheduling in time domain is already fixed. PDCCH is used to indicate the presence of PDSCH containing SIB1, the resource block (RB) assignment in the frequency domain and its transmission format.

Note that for a lite UE, the initial procedure to capture SIB1 425 can be as shown FIG. 8, i.e., via SIB0 405, however, after the lite UE gets in the network, the lite UE can still use SIB0 405 to find SIB1 425, e.g., to get the updated version of SIB1 425, or the lite UE can use another method to get SIB1 425, which may not necessarily go through SIB0 405. For example, a signal can be sent to the connected UE about the notification of change of SIB1 425 and where to get SIB1 425, or even the updated SIB1 425 itself. The SIB1 425 of the neighboring cells can also be considered to be sent to a lite UE, to allow lite UE to quickly search for the neighboring cells. If so, the lite UE can skip the SIB0 405 acquisition from the neighboring cells.

Figure 9:
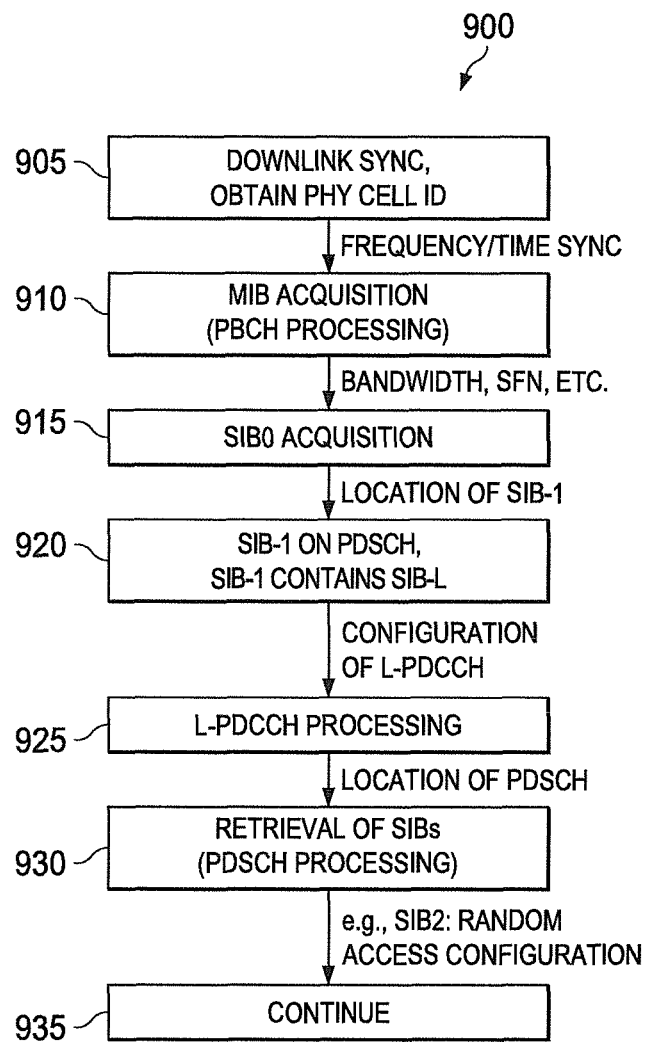
FIG. 9 illustrates another process for a lite UE acquiring system information according to embodiments of the present disclosure.

FIG. 9 illustrates another process for a lite UE acquiring system information according to embodiments of the present disclosure. The lite UE can be an MTC, such as a low cost MTC. In block 905, the UE obtains the physical (PHY) cell ID. The lite UE obtains the synchronization channel and the physical cell ID, and then the UE has the frequency/time domain sync. Then the UE processes the PBCH and acquires the MIB information in block 910. The UE obtains the bandwidth and superframe number. In block 915, the UE obtains SIB0, which indicates a location of SIB1. Acquisition of SIB1 on PDSCH occurs in block 920 and SIB1 contains SIB-L or is SIB-L. The L-PDCCH is processed in block 925 in the shared channel to determine the location of the other SIBs locations in PDSCH. PDSCH processing occurs in block 930 to retrieve the SIBs, which is the broadcast information that each UE may need to know. The UE can further decode other SIBs. The UE can also know the UE specific resources in PDSCH, where the resource allocation is indicated in L-PDCCH. Group specific resource allocation in PDSCH can be also indicated in L-PDCCH, and a UE can decode it if it is in the said group. Thereafter, the UE continues access in block 935. The entire process can be used for the initial access, or the process can be used for whenever the UE needs to re-enter the system. Once the UE is connected, the UE can carry out steps 910 (may be omitted if MIB is not updated), 915, 920, 925, 930, if needed such as when the UE needs to get the updated system information. When the UE is connected, the UE can carry out steps 915, 920, 925, and if the UE decodes there is data scheduled for it in step 925, the UE can decode PDSCH for its data.

FIG. 10 illustrates another resource allocation according to embodiments of the present disclosure. The embodiment of the resource allocation 1000 shown in FIG. 10 is for illustration only. Other embodiments could be used without departing from the scope of this disclosure.

In certain embodiments, SIB1 425 indicates a location of SIB-L 410. SIB1 425 indicates the location or resource allocation for SIB-L 410, then SIB-L 410 indicates the L-PDCCH 415. SIB1 425, SIB-L 410, L-PDCCH 415, and so forth, are all in PDSCH. In SIB1 425, there can be some fields common for both the regular UE and the lite UE, some fields only for regular UE, and some fields only for the lite UE. The regular UE will not try to decode the fields for the lite UE exclusively, and vice versa. The advantage is that the common fields for regular and lite UEs are efficiently sent, without duplicated copy to regular UE and lite UE respectively.

SIB0 405 can be located next to the PBCH 420 or indicated by PBCH 420. SIB0 405 indicates a location of SIB1 425. In turn, SIB1 425 indicates a location of SIB-L 410. SIB-L 410 indicates the configuration of L-PDCCH 415. SIB-L 410 can be delivered over a physical downlink channel; therefore, SIB1 425 can be omitted. The physical downlink channel for SIB-L 410 can be obtained by the UE after the UE obtains SIB0 405. After the UE acquires SIB-L 410, the UE knows the location of L-PDCCH 415. SIB1 425 scheduling in time domain is already fixed. PDCCH is used to indicate the presence of PDSCH containing SIB1, the resource block (RB) assignment in the frequency domain and its transmission format.

Figure 11:
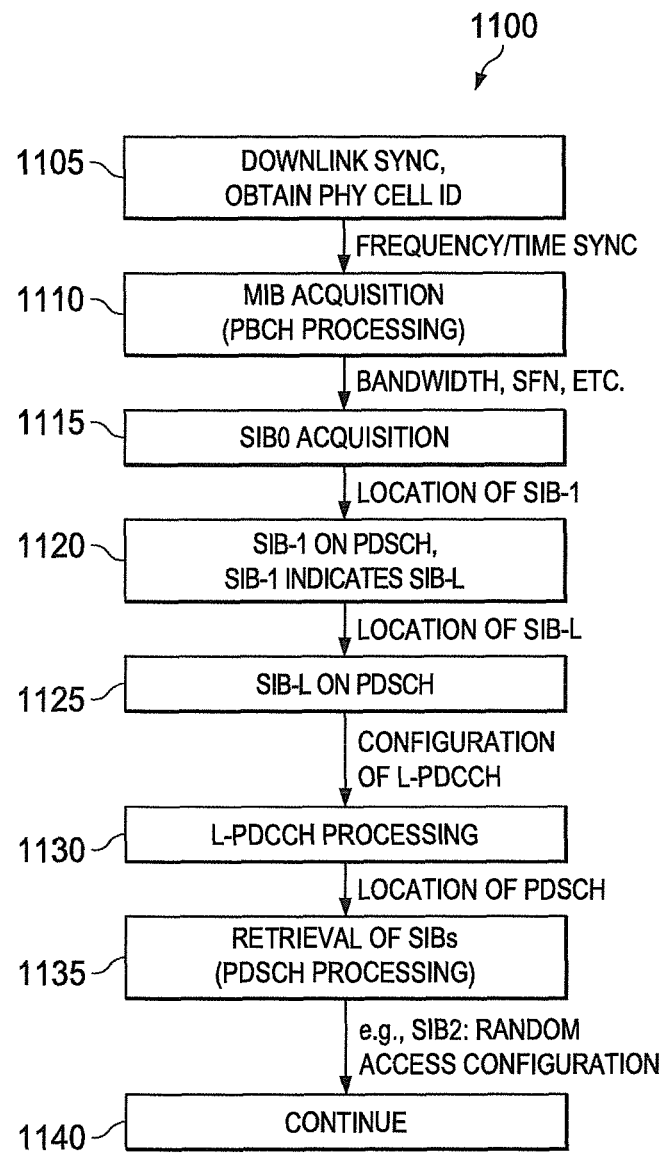
FIG. 11 illustrates another process for a lite UE acquiring system information according to embodiments of the present disclosure.

FIG. 11 illustrates another process for a lite UE acquiring system information according to embodiments of the present disclosure. The lite UE can be an MTC, such as a low cost MTC. In block 1105, the UE obtains the physical (PHY) cell ID. The lite UE obtains the synchronization channel and the physical cell ID, and then the UE has the frequency/time domain sync. Then the UE processes the PBCH and acquires the MIB information in block 1110. The UE obtains the bandwidth and superframe number. In block 1115, the UE obtains SIB0, which indicates a location of SIB1. Acquisition of SIB1 on PDSCH occurs in block 1120 and SIB1 indicates the location for SIB-L. SIB-L is processed in block 1125 on the PDSCH to obtain the L-PDCCH configuration. The L-PDCCH is processed in block 1130 in the shared channel to determine the location of the other SIBs locations in PDSCH. PDSCH processing occurs in block 1135 to retrieve the SIBs, which is the broadcast information that each UE may need to know. The UE can further decode other SIBs. The UE can also know the UE specific resources in PDSCH, where the resource allocation is indicated in L-PDCCH. Group specific resource allocation in PDSCH can be also indicated in L-PDCCH, and a UE can decode it if it is in the said group. Thereafter, the UE continues access in block 1140. The entire process can be used for the initial access, or the process can be used for whenever the UE needs to re-enter the system. Once the UE is connected, the UE can carry out steps 1110 (may be omitted if MIB is not updated), 1115, 1120, 1125, 1130, if needed such as when the UE needs to get the updated system information. When the UE is connected, the UE can carry out steps 1115, 1120, 1125, 1130, and if the UE decodes there is data scheduled for it in step 1130, the UE can decode PDSCH for its data.

In certain embodiments, SIB0 405 is fixed (i.e., hard-coded). For example, SIB0 405 can be located next to the PBCH 420. The physical channel for SIB0 can be pre-determined. Once the UE knows the PBCH 420, the UE is able to receive SIB0 405 using the similar method as the one to decode PBCH 420.

In certain embodiments, a pre-determined physical resource allocation is not necessarily right next to PBCH 420, or hard-coded so that the base station (E-Node-B (eNB)) uses the specified location to send SIB0 405 and the lite UE tries to decode SIB0 405 at the specified location of SIB0. For example, the pre-determined resource can be at a place after PBCH 420 (may not be consecutive to the resources allocated for PBCH, i.e., in between PBCH 420 and SIB0 405. There can be some resources in time/frequency), in the central band, within the subframe where PBCH 420 resides (subframe whose index mod 10 is 0), or in the subframe after the subframe where PBCH 420 resides (e.g., subframe whose index mod 10 is 1, 2, and so forth).

In certain embodiments, PBCH 420 and SIB0 405 are combined for the lite UE, or SIB0 405 is inserted in PBCH 420 and the resource allocated to PBCH 420 is increased. The lite UE decodes PBCH 420 and SIB0 405 at once, or the new PBCH 420 that contains SIB0 405. The regular UE decodes the entire PBCH 420 that contains SIB0 405, but it will not treat (i.e., process) SIB0 405.

In certain embodiments, SIB0 405 is blindly decoded. For example, the UE can use blind decoding to determine the location of SIB0 405. Therefore, SIB0 405 can be dynamically scheduled. The lite UE blind decodes the SIB0 405 by trying one or multiple hypothesis about the location of SIB0 405, and choosing the best.

Hypothesis testing can be done, for example, to estimate the channel status of channel used for SIB0 405, based on different number of eNB TX antenna ports. The lite UE blind decodes the reference signals assuming different antenna ports configuration, and the lite UE determines the channel conditions of SIB0 405. Then the lite UE further decodes SIB0 405. If multiple possible locations exist for SIB0 405 and SIB0 405 can be blind decoded by lite UE, the lite UE performs hypothesis testing to determine in which location SIB0 405 is located. For example, if there are two possible locations for SIB0 405 and these locations are pre-determined, but the SIB0 405 of an exemplary eNB actually is on location 1, the UE knows the two possible locations beforehand, and attempts to decode SIB0 405 at location 1 and location 2, respectively. If the UE decodes a meaningful message at location 1, but does not successfully decode SIB0 at location 2, then the UE uses the SIB0 405 decoded at location 1.

In certain embodiments, new system information for lite UEs includes L-PDCCH (Lite-PDCCH) configuration. The new system information can be in SIB-L 410. Once a lite UE obtains the information about L-PDCCH configuration, the scheduling information of the following SIBs (e.g., SIB1, 2, 3, can be signaled by L-PDCCH 415.

In certain embodiments, new system information for lite UEs includes the scheduling information of SIBs for lite UEs. The new system information can be in SIB-L 410. Once a lite UE obtains SIB-L 410, the scheduling information of the following SIBs can be obtained.

In certain embodiments, SIB for lite UE, SIB-L 410, can be delivered over a physical shared channel (data channel). A physical channel can be used to deliver SIB0 405. SIB0 405 can include the configuration information of SIB-L 410, e.g., SIB0 405 contains the scheduling information (time and frequency location) of SIB-L 410. After the lite UE decodes SIB0 405 successfully, the lite UE knows where to find SIB-L 410 on the PDSCH. Then it decodes SIB-L. After SIB-L 410 is successfully decoded, the lite UE obtains the information on where to locate the L-PDCCH 415 and the configurations of L-PDCCH 415. Then the lite UE can further proceed to process the L-PDCCH 415.

Figure 12:
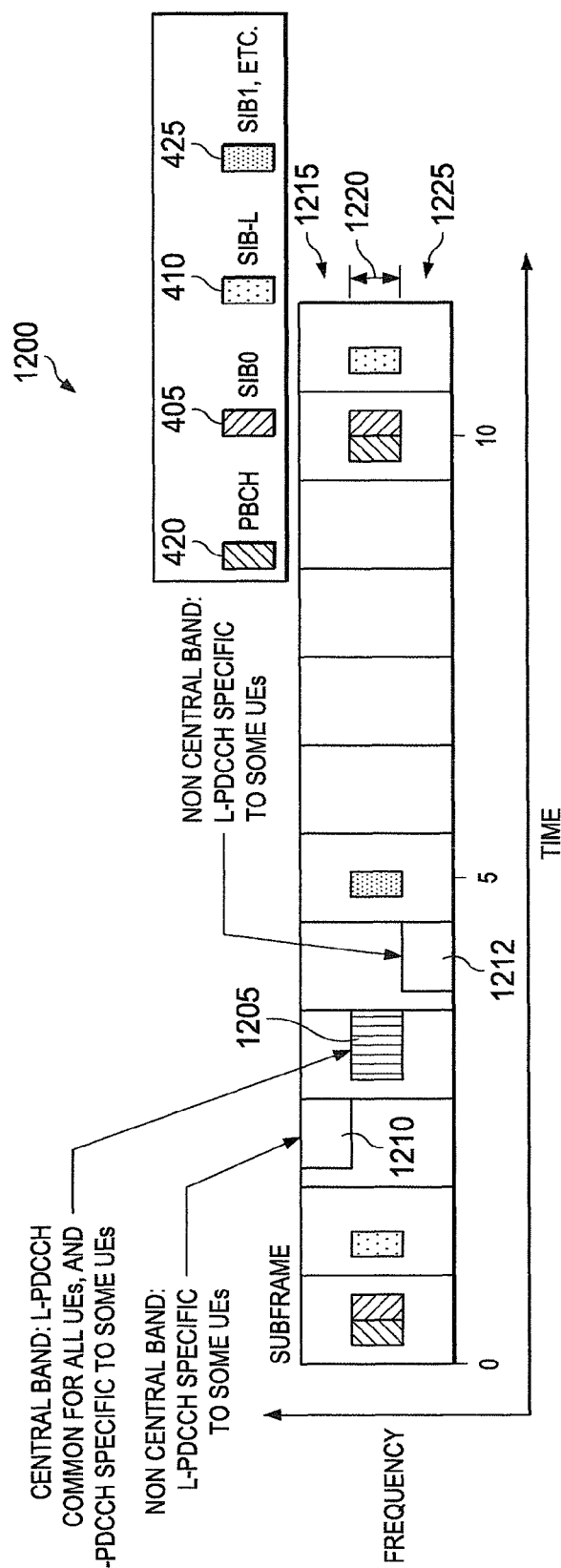
FIG. 12 illustrates a bandwidth with multiple zones according to embodiments of the present disclosure.

FIG. 12 illustrates a bandwidth with multiple zones according to embodiments of the present disclosure. The embodiment of the bandwidth 1200 shown in FIG. 12 is for illustration only. Other embodiments could be used without departing from the scope of this disclosure.

In one alternative, L-PDCCH 1205 carrying information common to all UEs can be in the central frequency band. In another alternative, L-PDCCH 1210, 1212 carrying UE specific information can be in one or multiple frequency bands (e.g., each band is a collection of contiguous physical resource blocks (PRBs)), with each band also denoted as a zone for communications with its corresponding L-PDCCH and PDSCH, and so forth, within the band. For example, the bandwidth can include a first non-central band 1215, a central band 1220 and a second non-central band 1225. Although the example in FIG. 12 illustrates three zones (three bands), more or less bands can be used without departing from the scope of this disclosure.

SIB-L 410 can indicate the configuration for both the L-PDCCH 1205 carrying information common to UEs, and the L-PDCCH 1210, 1212 carrying UE specific information. Alternatively, SIB-L 410 can indicate the configuration for both the L-PDCCH 1205 carrying information common to UEs, and the L-PDCCH 1205 (note that L-PDCCH can be sent in multiple occasions in the time domain) carrying UE specific information in the central frequency band 1220. Later, after UE receives zone switch information, which can indicate the configuration of the L-PDCCH zone that the UE would switch to, the UE can switch L-PDCCH from the central 1220 to other zone, either the first zone 1215 or second zone 1225. Alternatively, SIB-L 410 can indicate the configuration for L-PDCCH 1205 in central frequency band 1220. SIB-L 410 can also include the configuration for L-PDCCH zones 1215, 1225 in other frequency bands.

In certain embodiments, L-PDCCH is always in the central frequency band 1220, no matter whether it is for information common or specific to UEs. In this case, the SIB-L 410 only needs to indicate the time-domain location, that is, the subframe index in which the L-PDCCH resides.

Another alternative is that L-PDCCH carrying information common to all UEs can be sent in each of the zones 1215, 1220, 1225, including the central frequency band and other bands. In this case, the SIB-L 410 indicates both the time-domain location, i.e., the subframe index in which the L-PDCCH resides; as well as the frequency-domain information, including the zone index in which the L-PDCCH resides.

In certain embodiments, L-PDCCH that carries part, or all, of the information common to all UEs can be in the central frequency band 1220, L-PDCCH carrying UE specific information and L-PDCCH carrying part of the information common to all UEs can be in one or multiple frequency bands, with each band as a zone in which L-PDCCH resides.

In the example shown in FIG. 12, SIB0 405 includes configuration information of SIB-L 410 (on PDSCH), and SIB-L 410 includes configuration information of L-PDCCH 1205, 1210, 1212 (on PDSCH). SIB-L 410 is in the central frequency band 1220.

Although SIB0 405 is located next to the PBCH 420, the disclosure is not limited to this case. Rather, other embodiments can be used in which SIB0 405 is located at a different location. For example, SIB0 405 can be located in some pre-defined or hard coded location specified by a standard and that is not necessarily next to PBCH 420.

In certain embodiments, in the time domain, the L-PDCCHs in different frequency bands can be overlapped. That is, the L-PDCCHs are not necessarily disjointed in the time domain.

In certain embodiments, if a cell supports both the regular UEs and the lite UEs that operate on narrower band, the eNB can transmit the SIBs that are common to both types of UEs in the center frequency band 1220, so that both the regular UE and the lite UE can monitor the central frequency band 1220 for the SIBs. In this case the regular UEs receive the SIB scheduling information via regular PDCCH, whereas the lite-UE could get these SIBs by:

1) Reading SIB from the center band of PRBs in a per-determined subset of subframes: a) This subset can be pre-defined in the spec, e.g., [0, 5, 10, 15 . . . ], or [1, 6, 11, 16 . . . ]; or 2) This subset can be signaled in SIB0 405, which is defined above;

2) Not all subframes in the subset will carry SIB information, therefore, the Lite UE can blind decode the center band of PRBs in these subframes to determine if the SIB is present.

Other information that a cell tells all UEs can also be in the center of the frequency, e.g., the L-PDCCH 1205 common to all UEs such as the common control signaling (e.g., power control information for all UEs), the configurations of SIBs, and so forth.

There can be multiple approaches to design system information blocks (SIBs) for lite UEs.

Alternative 1: Defining new SIB(s) optimized for lite UEs, where the common contents (for both legacy and lite UEs) are also included. The SIBs for lite UEs can be in the central frequency band 1220. Alternatively, the SIBs can be duplicated in other non-central frequency bands 1215, 1225 in addition. The SIBs for the regular UEs can be anywhere in frequency domain. They do not necessarily be in the narrower band.

Alternative 2: Introducing a new SIB only for lite UEs, where the common contents are delivered in the existing SIBs. For this option, the SIBs to both lite and regular UEs can be at the central frequency band 1220. Alternatively, the SIBs can be duplicated in other non-central frequency bands 1215, 1225 in addition. The SIBs that are to lite UEs can be in the central frequency band 1220. Alternatively, the SIBs can be duplicated in other non-central frequency bands 1215, 1225 in addition.

Alternative 3: Adding the contents for lite UEs to one of existing SIB (e.g. SIB1). Legacy UEs cannot figure out the meaning of the contents newly added. For this option, the SIBs to both lite and regular UEs can be at the central frequency band 1220. Alternatively, the SIBs can be duplicated in other non-central frequency bands 1215, 1225 in addition.

Figure 13:
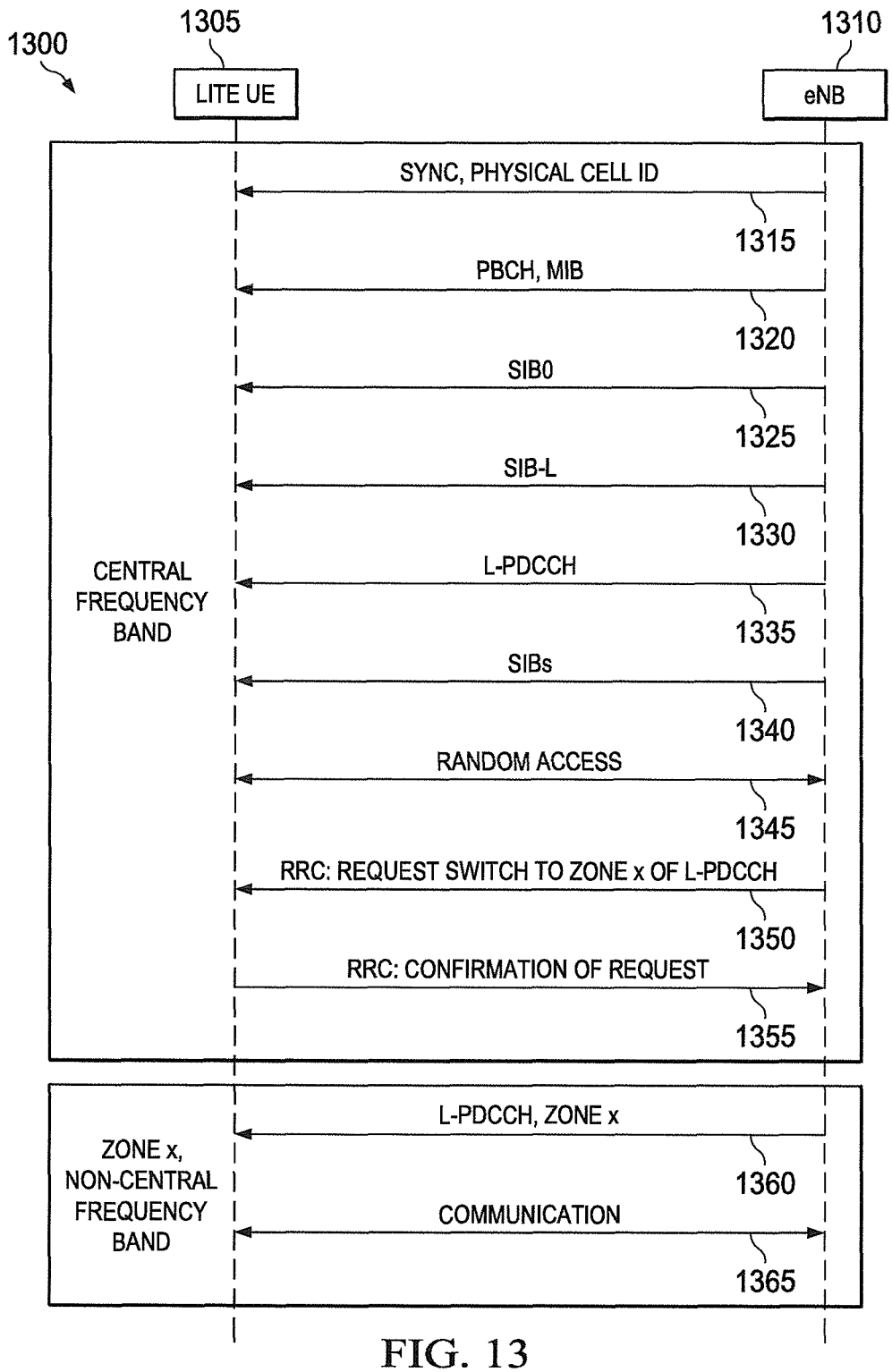
FIG. 13 illustrates zone switching according to embodiments of the present disclosure.

FIG. 13 illustrates zone switching according to embodiments of the present disclosure. The embodiment of the zone switching 1300 shown in FIG. 13 is for illustration only. Other embodiments could be used without departing from the scope of this disclosure.

Zone switching is similar to a hard handover within a frequency carrier. One or multiple zones can be defined or configured. A zone can be defined as certain resources in a time/frequency domain, for example, a zone can be a narrow frequency band which has specified resources in frequency and unlimited resource in time, though certain time resources (e.g., certain subframes, or resource blocks in time domain) can be excluded since they are used for other purposes. A zone can include the resources for downlink communication, e.g., L-PDCCH that can indicate the PDSCH intended for the lite UEs, and the PDSCH intended for the lite UEs. A zone also can include the resources for uplink communications.

For example, the L-PDCCH residing in a zone can consist of z contiguous PRB pairs. For example, z=6.

Zone switching can be defined and performed by two alternative methods.

For example, SIB-L indicates the zone splitting method. UE-specific zone is identified by the UE-ID that will be obtained after the random access procedure. For instance, the UE-ID can be mapped to the index of the zone that the UE should switch to (as an example, index of zone=mod(UE-ID, 3).

In another example, a lite UE is supposed to stay at the central frequency band, i.e., central zone of L-PDCCH (e.g., the central 6 RBs) until it receives the zone switching order via UE-specific RRC signaling.

The lite UE 1305 obtains the synchronization channel and the physical cell ID, and then the UE has the frequency/time domain sync from eNB 1310 in step 1315. The UE 1305 processes the PBCH and acquires the MIB information in step 1320. In step 1325, the UE 1305 obtains SIB0, which indicates a location of SIB-L. The UE 1305 receives SIB-L at the indicated location in step 1330. SIB-L indicates a location and configuration of L-PDCCH. The UE 1305 obtains the L-PDCCH in the central frequency band in step 1335. The UE 1305 can further receive and decode other SIBs in step 1340. The UE 1305 and eNB 1310 perform random access in step 1345. The UE 1305 receives from eNB 1310 an RRC: request to switch to zone x of L-PDCCH in step 1350. The UE 1305 confirms the request in step 1355. Then, the UE 1305 moves to zone x and receives L-PDCCH, zone x in step 1360. Thereafter, the UE 1305 and eNB 1310 communicate in step 1365.

The example of the zone switch procedure 1300 illustrates the case where SIB0 405 indicates SIB-L 410, and SIB-L 410 indicates L-PDCCH 415. However, zone switching 1300 is not limited to this case only, rather it can be applied to other procedures of how to get L-PDCCH 415, e.g., SIB0 405 contains SIB-L 410 and SIB-L 410 indicates L-PDCCH 415, SIB0 405 indicates SIB1 425 and SIB1 425 contains L-PDCCH 415, and so forth.

Figure 14:
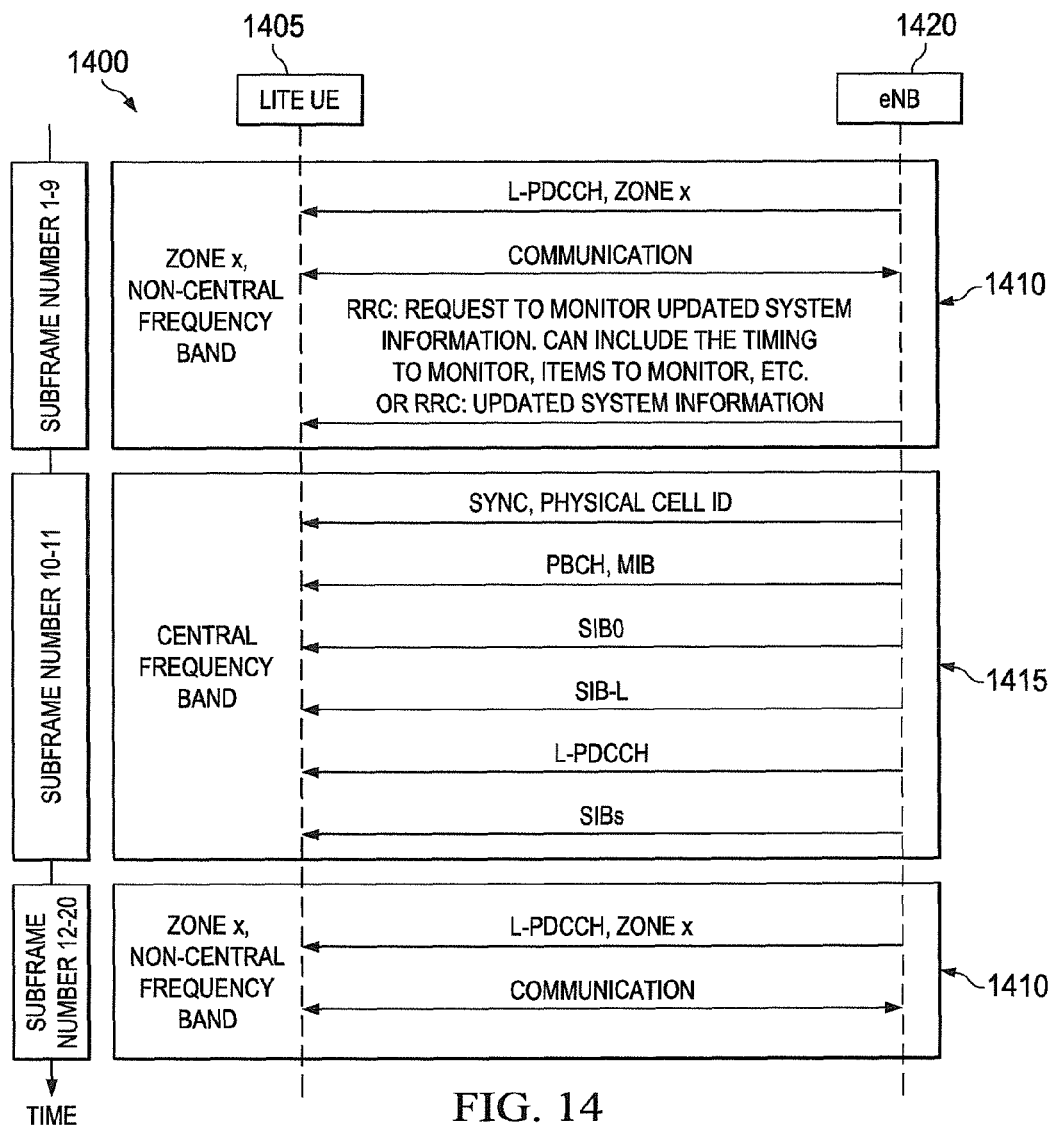
FIG. 14 illustrates another zone switching process according to embodiments of the present disclosure.

FIG. 14 illustrates another zone switching process according to embodiments of the present disclosure. The embodiment of the zone switching 1400 shown in FIG. 14 is for illustration only. Other embodiments could be used without departing from the scope of this disclosure.

A lite UE 1405 can switch from non-central frequency band 1410 to the central frequency band 1415 to monitor system information updates. The cell 1420 can send RRC signaling to the UE, to ask the lite UE 1405 to monitor the system information at the central frequency band 1410. The RRC signaling can include the information such as the timing to monitor, (e.g., at which frame, super frame, etc., or after how many superframes, frames, etc.), and the items to monitor, e.g., which SIB to monitor. The cell 1420 can send the signaling before the actual change of the system information. The cell 1420 can also send some updated system information to the lite UE 1405.

In certain embodiments, the monitoring can be based on need. The monitoring can also be periodic if necessary. The cell 1420 can tell the lite UE 1405 the periodicity of monitoring. In certain embodiments, the lite UE 1405 can also do an autonomous monitoring, e.g., during the time that the cell does not have any scheduled traffic to it.

In the example shown in FIG. 14, the lite UE 1405 switches from non-central frequency band 1410 to the central frequency band 1415 to monitor system information updates, and then switches back to non-central frequency 1410. Although a metric of number of subframes is used to illustrate the time elements of the procedure, the length of the duration of the subframes in the figures may be distorted in scale (i.e., the duration of subframes 1-9 and the duration of subframes 10-11 do not hold a proportional scale of 9:2 in the time line as in the Figure) and the embodiment shown is only for the purpose of illustration and other embodiments could be used without departing from the scope of this disclosure. In this example, the lite UE 1405 is communicating with eNB 1420 on zone x 1410, during subframes #1-9. Then, the lite UE 1405 switches to the central frequency band 1415 and communicates with eNB 1420 in the central frequency band 1415 on subframe 10-11. Afterwards, on subframe 12-20, the lite UE 1405 is on zone x 1410 again. The lite UE 1405 again communicates with eNB 1420 on zone x 1410. In other examples, the lite UE 1405 communicates with eNB 1420 on zone x 1410 on subframes n to n+m, where (n mod 10)=0. The lite UE 1405 communicates with eNB 1420 on the central band 1415 on subframes u to u+v, where (u mod 10)=0, u>n+m. Then, the lite UE 1405 communicates with eNB 1420 on zone x 1410 on subframes u+v+1 to u+v+w.

In certain embodiments, in the non-central frequency band 1415, some control channels, such as sync/preamble, and the like, can be added. The purpose is to allow the lite UE 1405 to stay in the zone of non-central frequency band as long as possible, to reduce the zone switching operations. One possible place to add the sync sequence or preamble is, for example, in the L-PDCCH of zones at the non-central frequency bands.

In certain embodiments, a special PCFICH can be defined for the lite UE, denoted as L-PCFICH. The L-PCFICH can include the information on the configuration of L-PDCCH. Alternatively, L-PCFICH, together with SIB0 405, can include the configuration of L-PDCCH 415, e.g., the location, starting point, the size of the region of L-PDCCH, and so forth. After the lite UE 1405 obtains the L-PCFICH successfully, the lite UE 1405 can further decode the other information, the L-PDCCH. Alternatively, after the lite UE 1405 decodes the L-PCFICH and SIB0 405 successfully, the lite UE 1405 can then decode L-PDCCH.

Figure 15:
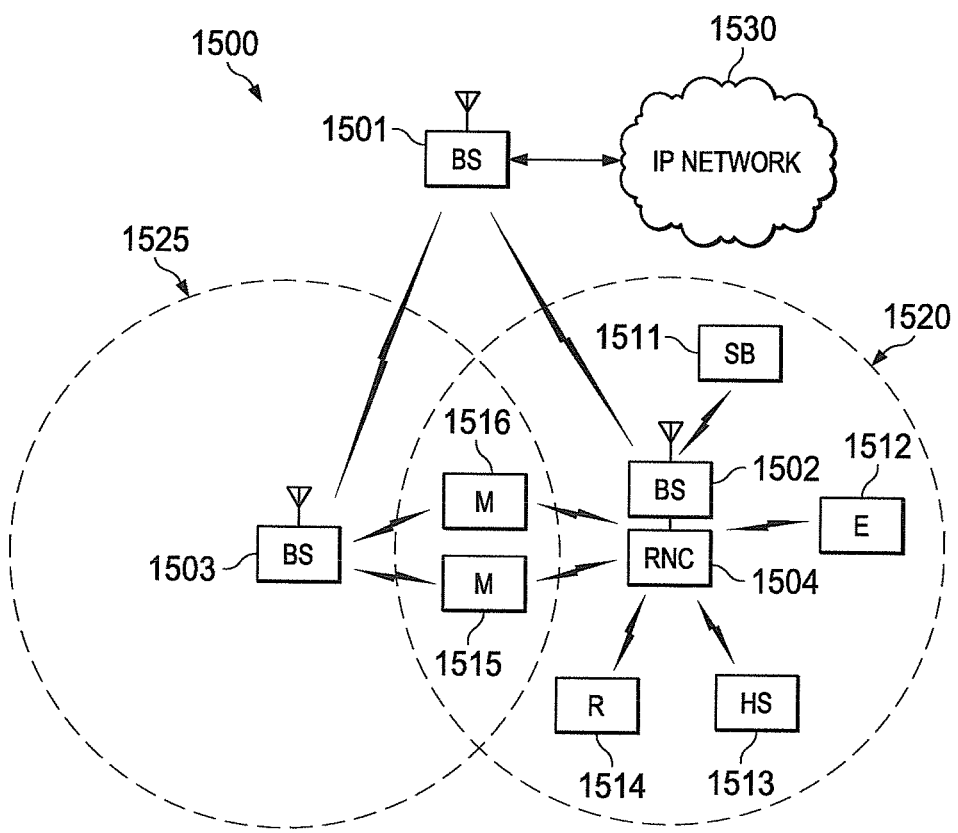
FIG. 15 illustrates an exemplary wireless network according to one embodiment of the present disclosure.

FIG. 15 illustrates an exemplary wireless network 1500 according to one embodiment of the present disclosure. In the illustrated embodiment, the wireless network 1500 includes base station (BS) 1501, base station 1502, and base station 1503. Base station 1501 communicates with base station 1502 and base station 1503. Base station 1501 also communicates with Internet protocol (IP) network 1530, such as the Internet, a proprietary IP network, or other data network. Base station 1502 communicates with a Radio Network Controller (RNC) 1504. In certain embodiments, the RNC 1504 may be a part of base station 1502. In certain embodiments, base station 5101 and base station 1503 may also communicate with the RNC 1504. In other embodiments, base station 1501 and base station 1503 may include, or be in communication with, another radio network controller similar to the RNC 1504. Base station 1502 or base station 1503 may communicate with IP network 1530 using wireline, instead of communicating with base station 1501 wirelessly.

Base station 1502, either in cooperation with the RNC 1504 or through the RNC 1504, provides wireless broadband access to the network 1530 to a first plurality of subscriber stations within a coverage area 1520 of base station 1502. The first plurality of subscriber stations includes subscriber station (SS) 1511, subscriber station 1512, subscriber station 1513, subscriber station 1514, subscriber station 1515 and subscriber station 1516. Subscriber stations 1511-1516 may be any wireless communication device, such as, but not limited to, a mobile phone, mobile PDA and any mobile station (MS). In an exemplary embodiment, SS 1511 may be located in a small business (SB), SS 1512 may be located in an enterprise (E), SS 1513 may be located in a WiFi hotspot (HS), SS 1514 may be located in a residence, and SS 1515 and SS 1516 may be mobile devices.

Base station 1503 provides wireless broadband access to the network 1530, via base station 1501, to a second plurality of subscriber stations within a coverage area 1525 of base station 1503. The second plurality of subscriber stations includes subscriber station 1515 and subscriber station 1516. In alternate embodiments, base stations 1502 and 1503 may be connected directly to the Internet by means of a wired broadband connection, such as an optical fiber, DSL, cable or T1/E1 line, rather than indirectly through base station 1501.

In other embodiments, base station 1501 may be in communication with either fewer or more base stations. Furthermore, while only six subscriber stations are shown in FIG. 1, it is understood that the wireless network 1500 may provide wireless broadband access to more than six subscriber stations. It is noted that subscriber station 1515 and subscriber station 1516 are on the edge of both coverage area 1520 and coverage area 1525. Subscriber station 1515 and subscriber station 1516 each communicate with both base station 1502 and base station 1503 and may be said to be cell-edge devices interfering with each other. For example, the communications between BS 1502 and SS 1516 may be interfering with the communications between BS 1503 and SS 1515. Additionally, the communications between BS 1503 and SS 1515 may be interfering with the communications between BS 1502 and SS 1516.

Subscriber stations 1511-1516 may use the broadband access to network 1530 to access voice, data, video, video teleconferencing, and/or other broadband services. In an exemplary embodiment, one or more of subscriber stations 1511-1516 may be associated with an access point (AP) of a WiFi WLAN. Subscriber station 1516 may be any of a number of mobile devices, including a wireless-enabled laptop computer, personal data assistant, notebook, handheld device, or other wireless-enabled device. Subscriber station 1514 may be, for example, a wireless-enabled personal computer, a laptop computer, a gateway, or another device.

Dotted lines show the approximate extents of coverage areas 1520 and 1525, which are shown as approximately circular for the purposes of illustration and explanation only. It should be clearly understood that the coverage areas associated with base stations, for example, coverage areas 1520 and 1525, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 1520 and 1525 of base stations 1502 and 1503, may extend in the range from less than 2 kilometers to about fifty kilometers from the base stations.

As is well known in the art, a base station, such as base station 1501, 1502, or 1503, may employ directional antennas to support a plurality of sectors within the coverage area. In FIG. 1, base stations 1502 and 1503 are depicted approximately in the center of coverage areas 1520 and 1525, respectively. In other embodiments, the use of directional antennas may locate the base station near the edge of the coverage area, for example, at the point of a cone-shaped or pear-shaped coverage area.

Although FIG. 15 depicts one example of a wireless network 1500, various changes may be made to FIG. 15. For example, another type of data network, such as a wired network, may be substituted for the wireless network 1500. In a wired network, network terminals may replace ES's 1501-103 and SS's 1511-1516. Wired connections may replace the wireless connections depicted in FIG. 15.

Figure 16:
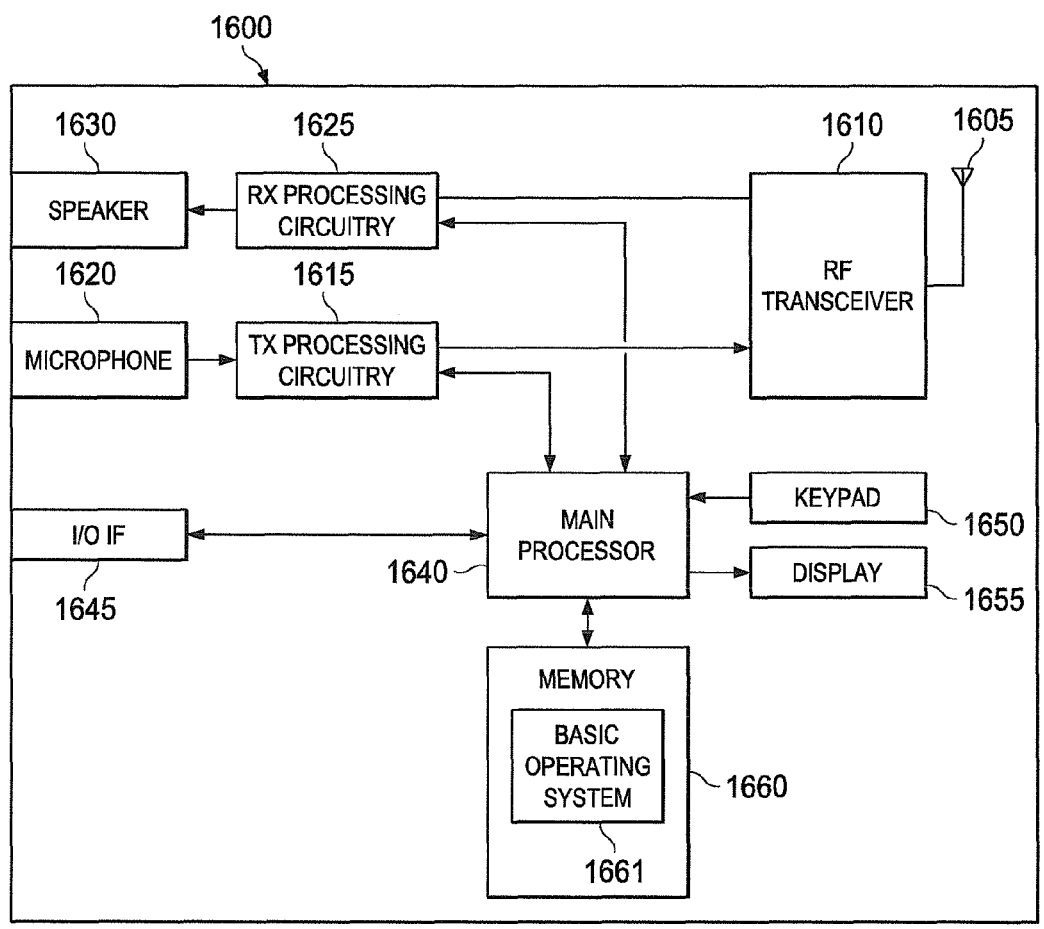
FIG. 16 illustrates a wireless mobile station according to embodiments of the present disclosure.

FIG. 16 illustrates a wireless mobile station according to embodiments of the present disclosure. In certain embodiments, the wireless mobile station 1600 may represent any of the subscriber stations 1511-1516 shown in FIG. 15. The embodiment of the wireless mobile station 1600 illustrated in FIG. 16 is for illustration only. Other embodiments of the wireless mobile station 1600 could be used without departing from the scope of this disclosure.

The wireless mobile station 1600 comprises an antenna 1605, a radio frequency (RF) transceiver 1610, transmit (TX) processing circuitry 1615, a microphone 1620, receive (RX) processing circuitry 1625 and a speaker 1630. The mobile station 200 also comprises a main processor 1640, an input/output (I/O) interface (IF) 1645, a keypad 1650, a display 255 and a memory 1660.

The RF transceiver 1610 receives from the antenna 1605 an incoming RF signal transmitted by a base station of the wireless network 1500. The RF transceiver 1610 down-converts the incoming RF signal to produce an intermediate frequency (IF) or a baseband signal. The IF or baseband signal is sent to the RX processing circuitry 1625 that produces a processed baseband signal by filtering, decoding and/or digitizing the baseband or IF signal. The RX processing circuitry 1625 transmits the processed baseband signal to the speaker 1630 (i.e., voice data) or to the main processor 1640 for further processing (e.g., web browsing).

The TX processing circuitry 1615 receives analog or digital voice data from the microphone 1620 or other outgoing baseband data (e.g., web data, e-mail, interactive video game data) from the main processor 1640. The TX processing circuitry 1615 encodes, multiplexes and/or digitizes the outgoing baseband data to produce a processed baseband or IF signal. The RF transceiver 1610 receives the outgoing processed baseband or IF signal from the TX processing circuitry 1615. The RF transceiver 1610 up-converts the baseband or IF signal to a RF signal that is transmitted via the antenna 1605.

In some embodiments of the present disclosure, the main processor 1640 is processing circuitry, such as a microprocessor or microcontroller. The memory 1660 is coupled to the main processor 1640. The memory 1660 can be any computer-readable medium. For example, the memory 1660 can be any electronic, magnetic, electromagnetic, optical, electro-optical, electro-mechanical and/or other physical device that can contain, store, communicate, propagate, or transmit a computer program, software, firmware, or data for use by the microprocessor or other computer-related system or method. According to such embodiments, part of the memory 1660 comprises a random access memory (RAM) and another part of the memory 1660 comprises a Flash memory, which acts as a read-only memory (ROM).

The main processor 1640 executes a basic operating system program 1661 stored in the memory 1660 in order to control the overall operation of the mobile station 1600. In one such operation, the main processor 1640 controls the reception of forward channel signals and the transmission of reverse channel signals by the RF transceiver 1610, the RX processing circuitry 1625, and the TX processing circuitry 1615, in accordance with well-known principles.

The main processor 1640 is capable of executing other processes and programs resident in the memory 1660. The main processor 1640 can move data into or out of the memory 1660, as required by an executing process. The main processor 1640 can move data into or out of the memory 1660, as required by an executing process. The main processor 1640 is also coupled to the I/O interface 1645. The I/O interface 1645 provides the mobile station 1600 with the ability to connect to other devices such as laptop computers and handheld computers. The I/O interface 1645 is the communication path between these accessories and the main processor 1640.

The main processor 1640 is also coupled to the keypad 250 and the display unit 1655. The operator of the mobile station 1600 uses the keypad 1650 to enter data into the mobile station 1600. The display 1655 may be a liquid crystal or light emitting diode (LED) display capable of rendering text and/or graphics from web sites. Alternate embodiments may use other types of displays. For example, for an embodiment in which the display 1655 is a touch-screen display, the keypad 1650 may be provided via the display 1655.

For some embodiments, the mobile station 160 is configured to receive SIBs as described herein above. The main processor 1640 executes function to process the PBCH, SIBs, and L-PDCCH.

Although FIG. 16 depicts one example of a mobile station 1600, various changes may be made to FIG. 16. For example, a wired or wireless network terminal may be substituted for the mobile device 1600. A wired network terminal may or may not include components for wireless communication, such as an antenna.

Although various features have been shown in the figures and described above, various changes may be made to the figures. For example, the size, shape, arrangement, and layout of components shown in FIGS. 1, 2, 4, 6, 8, 10 and 12-16 are for illustration only. Each component could have any suitable size, shape, and dimensions, and multiple components could have any suitable arrangement and layout. Also, various components in FIGS. 1, 2, 4, 6, 8, 10 and 12-16 could be combined, further subdivided, or omitted and additional components could be added according to particular needs. Further, each component in a device or system could be implemented using any suitable structure(s) for performing the described function(s). In addition, while FIGS. 3, 5, 7, 9 and 11 illustrate various series of steps, various steps in FIGS. 3, 5, 7, 9 and 11 could overlap, occur in parallel, occur multiple times, or occur in a different order. In addition, although illustrated as individual embodiments, various embodiments can be combined with other embodiments in whole or part without departing from the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless communications network, a user equipment (UE) configured for machine type communications (MTC), the UE comprising:
   a receiver configured to receive a physical broadcast channel (PBCH) in a reduced bandwidth from at least one base station, the reduced bandwidth comprising a subset of a bandwidth for a standard UE; and
   processing circuitry configured to process the PBCH to acquire system information blocks (SIB), wherein at least one SIB is configured to indicate a location of a lite SIB (SIB-L), the SIB-L configured to indicate a location of a lite physical downlink control channel (L-PDCCH).

2. The UE as set forth in claim 1, wherein the SIB is in the reduced bandwidth wherein the reduced bandwidth is in the center of the frequency band.

3. The UE as set forth in claim 1, wherein the at least one SIB is at least one of:
   including the SIB-L; and
   the SIB-L.

4. The UE as set forth in claim 1, wherein a first SIB is configured to indicate a location of a second SIB, wherein the second SIB is at least one of:
   configured to indicate a location of the SIB-L; and
   Including the SIB-L.

5. The UE as set forth in claim 1, wherein the subset of a bandwidth comprises a first frequency range of the bandwidth of the standard UE, and wherein the UE is configured to communicate on a second frequency range of the bandwidth during a first time period and receive the L-PDCCH on the first frequency range during a second time period.

6. The UE as set forth in claim 5, wherein the UE is configured to communicate on the second frequency range of the bandwidth during a third time period.

7. The UE as set forth in claim 1, wherein L-PDCCH is a modified version of an existing enhanced PDCCH (E-PDCCH).

8. A wireless communications network configured to communicate with at least one user equipment (UE) configured for machine type communications (MTC), the network comprising:
   a base station configured to transmit a physical broadcast channel (PBCH) in a reduced bandwidth to the at least one UE, the reduced bandwidth comprising a subset of a bandwidth for a standard UE, wherein the PBCH is configured to enable the at least one UE to acquire system information blocks (SIB), wherein a lite SIB (SIB L) is configured to indicate a location of a lite physical downlink control channel (L-PDCCH).

9. The network as set forth in claim 8, wherein the SIB-L is in the reduced bandwidth wherein the reduced bandwidth is in the center of the frequency band.

10. The network as set forth in claim 8, wherein the L-PDCCH is different than a physical downlink control channel (PDCCH), and wherein the PDCCH is configured for the standard UE.

11. The network as set forth in claim 8, wherein a first SIB is configured to indicate a location of a second SIB, wherein the second SIB is at least one of:
   configured to indicate a location of the SIB-L;
   including the SIB-L.

12. The network as set forth in claim 8, wherein the subset of a bandwidth comprises a first frequency range of the bandwidth of the standard UE, and wherein the base station is configured to communicate with the at least one UE on a second frequency range of the bandwidth during a first time period and transmit the L-PDCCH on the first frequency range during a second time period.

13. The network as set forth in claim 12, wherein the base station is configured to communicate with the at least one UE on the second frequency range of the bandwidth during a third time period.

14. The network as set forth in claim 8, wherein the L-PDCCH is a modified version of an existing enhanced PDCCH (E-PDCCH).

15. For use in a wireless communications network, a method of supporting machine type communications, the method comprising:
   processing a physical broadcast channel (PBCH) to acquire a lite SIB (SIB-L); and
   determining a location of a lite physical downlink control channel (L-PBCCH) from the SIB-L.

16. The method as set forth in claim 15, wherein the SIB-L is in the reduced bandwidth wherein the reduced bandwidth is in the center of the frequency band.

17. The method as set forth in claim 15, wherein the L-PDCCH is different than a physical downlink control channel (PDCCH), and wherein the PDCCH is configured for the standard UE.

18. The method as set forth in claim 15, wherein a first SIB is configured to indicate a location of a second SIB, and wherein the second SIB is at least one of:
   configured to indicate a location of the SIB-L; and
   including the SIB-L.

19. The method as set forth in claim 15, wherein the subset of a bandwidth comprises a first frequency range of the bandwidth of the standard UE, further comprising:
   communicating with the base station on a second frequency range of the bandwidth during a first time period; and
   receiving the L-PDCCH on the first frequency range during a second time period.

20. The method as set forth in claim 19, further comprising: communicating with the base station on the second frequency range of the bandwidth during a third time period.

21. The method as set forth in claim 15, wherein the L-PDCCH is a modified version of an existing enhanced PDCCH (E-PDCCH).

* * * * *